United States Patent

[11] 3,583,186

| [72] | Inventor | Sture Andersson<br>Vasteras, Sweden |
|---|---|---|
| [21] | Appl. No. | 730,241 |
| [22] | Filed | May 20, 1968 |
| [45] | Patented | June 8, 1971 |
| [73] | Assignee | Allmanna Svenska Elektrksha<br>Aktiebolaget<br>Vasteras, Sweden |
| [32] | Priority | May 26, 1967, Apr. 19, 1968 |
| [33] | | Sweden |
| [31] | | 7401/67 and 5243/68 |

[54] DEVICE FOR CONTROLLING WIRE OR TAPE ROLLING MILLS
3 Claims, 2 Drawing Figs.

| [52] | U.S. Cl. | 72/17 |
| [51] | Int. Cl. | B21b 37/06 |
| [50] | Field of Search | 72/8, 17, 10, 12, 205, 9, 11 |

[56] References Cited
UNITED STATES PATENTS

| 2,295,284 | 9/1942 | McCaffrey et al. | 72/205X |
| 3,188,841 | 6/1965 | Wallace | 72/9 |
| 3,332,263 | 7/1967 | Beadle et al. | 72/7 |

*Primary Examiner*—Milton S. Mehr
*Attorney*—Jennings Bailey, Jr.

ABSTRACT: In rolling mills having at least two roller pairs with individual driving means there is a device for controlling the same, which device contains amplifiers for regulating the speed of the driving means. Between the roller pairs are arranged measuring devices to measure the position of the loop of material to be rolled, the output side of which is connected to the speed amplifier of a subsequent or preceding roller pair in the direction of rolling. This output side is also connected to the input side of the summator for subsequent and preceding measuring devices respectively.

INVENTOR.
STURE ANDERSSON
BY
Jennings Bailey Jr

3,583,186

DEVICE FOR CONTROLLING WIRE OR TAPE ROLLING MILLS

BACKGROUND OF THE INVENTION

1. Field of the Invention

The present invention relates to a device for controlling wire or tape rolling mills having at least two roller pairs with individual driving means with amplifiers for regulating the speed.

2. The Prior Art

During continuous rolling in several roller pairs the speed of the roller pairs is often regulated by measuring the height of the loop, usually mechanically, and in accordance with the measuring signal obtained, controlling the speed of the driving member so that the height of the loop is held within the desired limits. Such arrangements have operated well but as the loop measuring device has become more complicated and the rolling speed has increased, it has become necessary to use amplifiers, usually transistorized, which has caused problems in such loop regulation. Among other things it has been difficult to achieve common zero signals for the amplifiers.

SUMMARY OF THE INVENTION

The invention aims at a solution of these and other similar problems and is characterized in that measuring devices are arranged between the roller pairs to measure the position of the loop of material to be rolled, the output signal of said measuring device being supplied to a summator, the output side of which is connected to the speed amplifier of subsequent or preceding roller pairs in the direction of rolling and to the input side of the summator for subsequent or preceding measuring devices, respectively. Such a device enables accurate control of the loop using several known loop-position emitters even at high rolling speeds and a faulty position of the loop will cause a change in speed along the entire chain of driving members following or preceding the fault. Transistorized control and speed signal amplifiers can be used.

In various arrangements it is desirable to be able easily to set a certain relative speed difference between the different driving members-roller pairs or a certain tension between them. A problem with such arrangements is to maintain the same tension between two adjacent roller pairs even if the speed of previous or subsequent roller pair is altered. If potentiometers are used to adjust the different roller speeds individually, connected to a ramp having a certain conducting voltage and then the setting is altered, the other potentiometers must also be readjusted in order to maintain the tension between adjacent roller pairs.

By a special embodiment of the invention a solution of these problems has been obtained. This embodiment is characterized in that the summators are cascade-connected and provided on the input side with potentiometers for setting the relative speed differences. The output signals are supplied to adjacent speed amplifiers and following summators in the cascade direction. An alteration in speed by adjustment of the potentiometer of speed regulating amplifier and thus a driving member thus causes an alteration in speed for the other driving members so that the tension, etc. between adjacent roller pairs is maintained without readjustment of the other potentiometers.

BRIEF DESCRIPTION OF THE DRAWINGS

The invention will be more fully described with reference to the accompanying figures in which.

DESCRIPTION OF THE PREFERRED EMBODIMENTS

Figure 1:
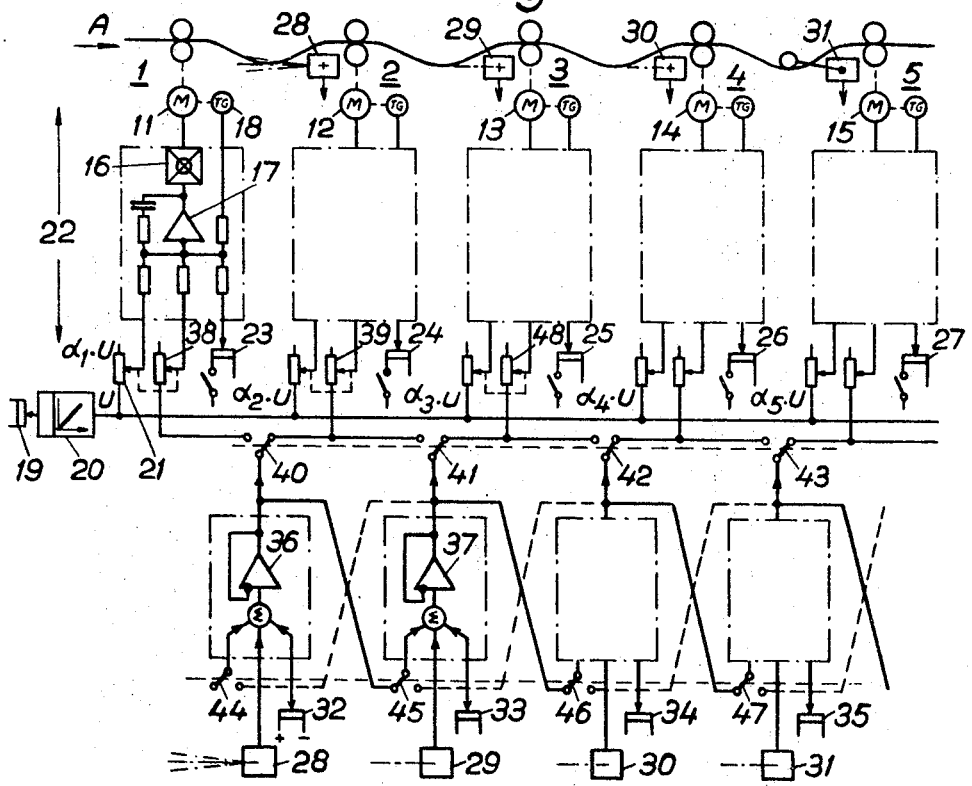
FIG. 1 shows a connection diagram for a driving and regulating means in a wire rolling mill and FIG. 2 the same thing in a tape rolling mill.

FIG. 1 shows a continuous rolling mill with five pairs of rollers 1, 2, 3, 4, 5 for rolling in the direction of the arrow A. Each pair, either with or without supporting rollers, is driven by a motor (M), 11, 12, 13, 14 and 15, which obtains its armature current through a thyristor 16 (shown only for the motor 11). A proportional integrating amplifier 17 is connected to the control circuit of the thyristor and to the input side of this amplifier is connected, amongst other things, a speed signal from a tachometer-generator (TG) 18.

From a common and adjustable source of voltage, a so-called ramp, is obtained a reference signal which increases to begin with. A certain signal (at 19) is supplied from the ramp to an integrating amplifier 20 and its output signal increases during the first part of the connection time for the signal 19, and is afterwards constant.

A certain proportion of the voltage U which is the output signal of amplifier 20, in this case $\alpha_1 \cdot U$, is supplied to the proportional integrating transistor amplifier 17 on the input side. $\alpha_1$ is set by a potentiometer 21 and corresponding desired references $\alpha_2 \cdot U$, $\alpha_3 \cdot U$, $\alpha_4 \cdot U$ and $\alpha_5 \cdot U$ are set on the other driving means in the rolling mill. The desired proportion of the voltage U will thus be a reference for the speed regulation, schematically designated 22 on the left in FIG. 1.

By means of a special forward slip member 23 (near the motor 11), 24, 25, 26 and 27 (on the other stands) a certain forward slip is set which gives 1—2 percent increase in speed to partly compensate the drop in speed when the material is fed into the mill first. When the material reaches the roller pair the speed decreases to its normal value and the forward slipping is disconnected.

Between each roller pair or between some of these are arranged measuring means to measure the position of the loop, for example provided with a rotating mirror or slots and photocells having a narrow field of vision so that a pulse is generated which corresponds to the position of the loop. The pulse guides a converter or a flip-flop device and an output signal is generated corresponding to the position of the loop. The position may also be measured by an arm having a contact roller guiding a potentiometer or inductive transducer. Measuring means of the last-mentioned type are shown at 28, 29, 30 and 31 (see also FIG. 2), and for the sake of clarity the same members are also inserted at the foot of FIG. 1.

The output signals from the measuring members 23—31 are supplied to respective summators 36, 37, usually a nonsign-reversing, proportional amplifier, possibly together with the signal from one of the subsequent setting members 32, 33, 34 and 35 each constituting an adjustable voltage source intended for manual control of the height of the loop. The summators 36, 37, etc. are connected to the driving means of a subsequent or preceding roller pair. The displaceable contacts on the potentiometers 21 are connected to (screwed into) the movable contacts for a second potentiometer 38, 39, etc. so that coordination is obtained between reference signals (at 21) and signals from the summators 36, 37, etc.

The output side of the summators 36, 37, etc. is also connected to the input side of a subsequent summators (unbroken line) or preceding summator broken. By means of switches 40, 41, 42, 43 and 44, 45, 46, 47, respectively, the direction can be altered from forwards control, that is right-hand position for 40—43 to left-hand position for 44—47 and backwards control, that is left-hand position for 40—43 and right-hand position for 44—47.

The device operates in the following way:

When material has been fed into the rolling mill, rolling takes place at normal speed and the loop height between the roller pairs should be kept at a certain value. The control means is set for forward control (switches 40—47 being set according to FIG. 1). The driving means (11—15) of the roller pairs maintain a certain speed, the speed of the latter subsequent motors being somewhat higher than that of the earlier motors, the speeds of the motors being controlled; by means of the reference devices 21, etc. and tachometer-generators (TG) 18, etc. to maintain to the desired value. If the height of the loop between the pairs 1 and 2 at the measurement indicator 28 increases suddenly, an altered signal is obtained at the summator 36 and thus a proportional output signal is supplied to the potentiometer 39 in the second roller pair 2, well as to the input of the summator 37, the output signal of which to motor 13 is then altered in accordance with the output signal from the measuring device 28 and the output signals from other subsequent summators which are fed to their respective motors such as 14 and 15 are also altered.

An altered output signal from the measuring device 29 therefore does not influence the summator but only the subsequent 36 summators. The output signal from the summator 36 is supplied directly only to the potentiometer 39, not the potentiometer 38 of the roller pair 1. If the person operating the rolling mill considers that a loop increases or decreases disturbingly, it is possible for him to alter the height of the loop by means of the sequence adjusting member for the loops (32—35) and this signal will have the same effect as signals from the measuring device 28—31. It should be noted that the input signal to the speed amplifier is a summation (sum or difference) of reference signal, loop-position signal and speed signal, and there is thus no need of a constant zero reference for these transistorized amplifiers 17, etc.

Figure 2:
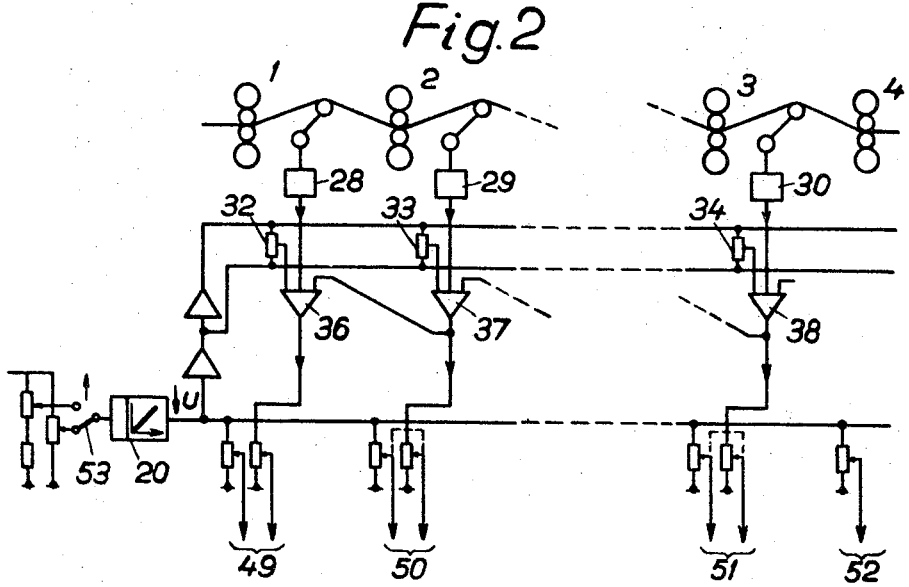

FIG. 2 shows a corresponding installation for tape rolling with four rollers pairs 1, 2, 3 and 4 having operating and supporting rollers, where either the supporting rollers or the operating rollers are driven. The loop transducers 28, 29, 30 are placed between the different roller pairs and summators are placed in the same way as in FIG. 1 as well as sequence adjusting members 32, 33, 34. The guiding pairs 49, 50, 51 and 52 lead to driving members 11—15 of respective motors 11—15, not shown. The conducting voltage U is obtained through the ramp device (integrating amplifier) 20. When, for example, heat, that is the glowing material to be rolled, reaches the first roller pair it is rolled at low speed which, when it reaches the coiling machine (not shown), increases since the conducting voltages from the ramp are increased. Such so-called zoom-rolling is one method of maintaining a constant temperature for the material. At the start, for instance, the rolling speed is 70 percent of the maximum, i.e. when the temperature of the material is highest, whereas when the temperature starts to decrease, the speed is increased so that heat generated during the rolling is completely or partly compensated by the lower heat of the material itself. Zoom-rolling can be obtained by switching the switch 53 to the upper position.

The device according to FIG. 2 operates in generally the same manner as that described for FIG. 1.

I claim:

1. Device for controlling wire or tape rolling mills having at least first, second and third roller pairs with individual driving means with individual motor-control amplifiers connected thereto for regulating the speed of the driving means, measuring means between said first and second and said second and third roller pairs for measuring the position therebetween of a loop of material to be rolled, at least first and second summators having their outputs connected to the motor control amplifiers of adjacent roller pairs, at least two adjustable voltage sources, means to transmit the output of the measuring means between the first and second roller pairs and one of said adjustable voltage sources to the first summator, means connecting the output of said first summator to the speed regulating amplifier of one of said first and second roller pairs, means connecting the output of the measuring means between the second and third roller pairs, the other of said adjustable voltage sources and the output of the first summator to the second summator, and means to transmit the output of the second summator to one of the motor control means of the second and third roller pairs.

2. Device according to claim 1, in which the transmitting means includes switches connected at the output side of the summators for alternatively connecting or disconnecting the forward and backward control, respectively, in relation to the rolling direction.

3. Device according to claim 1, in which the transmitting means includes a proportional amplifier.